J. B. Savage.
Nut Machine.
No. 3,050. Reissued Jul. 21, 1868.
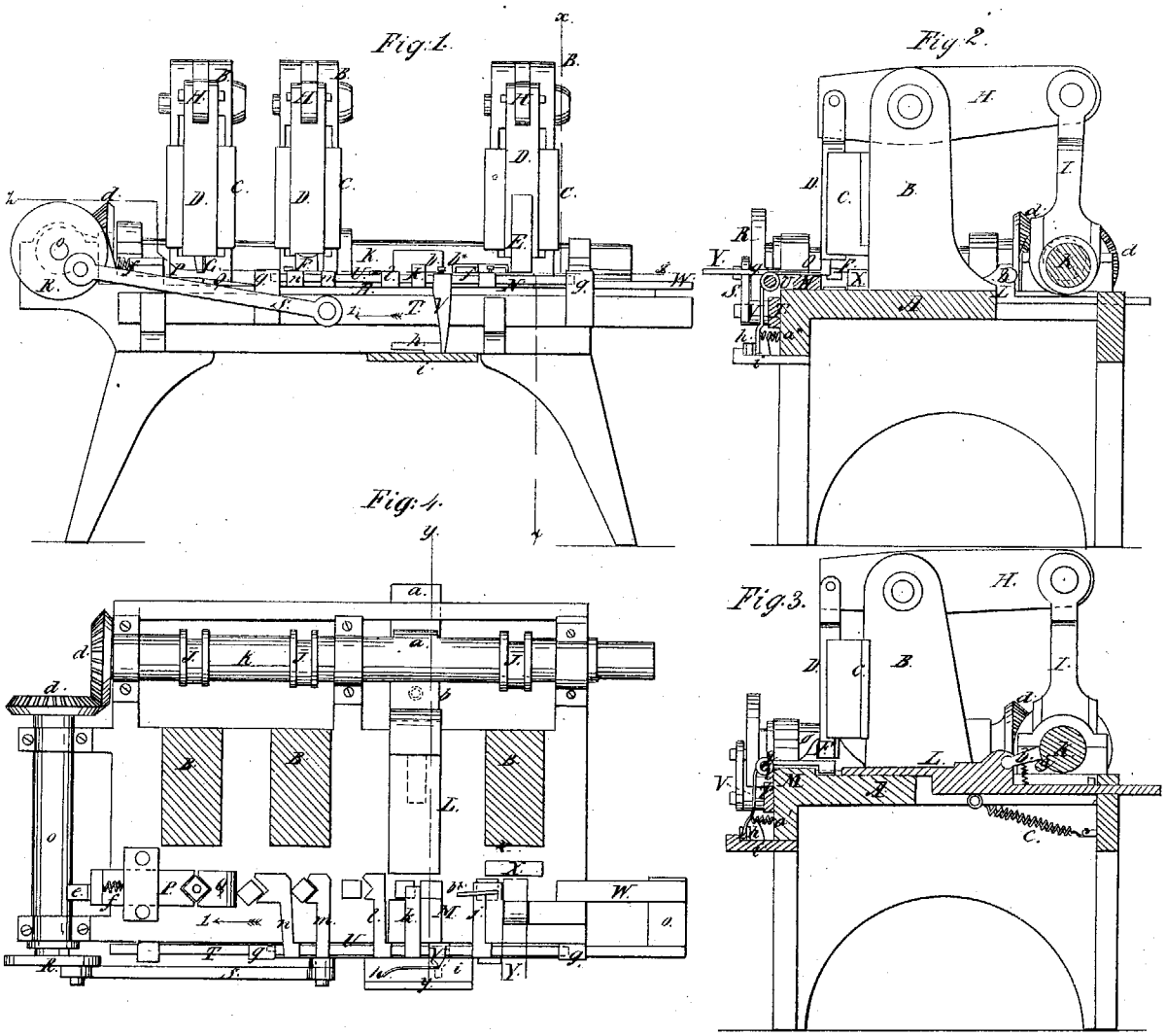
Witnesses.
Douglas P. Williams
H. R. Bradley
Inventor:
Julius B. Savage
N. PETERS, PHOTO-LITHOGRAPHER, WASHINGTON, D. C.

UNITED STATES PATENT OFFICE.

JULIUS B. SAVAGE, OF SOUTHINGTON, ASSIGNOR TO THE UNION NUT COMPANY, OF UNIONVILLE, CONNECTICUT.

IMPROVED MACHINE FOR MAKING NUTS.

Specification forming part of Letters Patent No. 22,310, dated December 14, 1858; Reissue No. 3,050, dated July 21, 1868.

*To all whom it may concern:*

Be it known that I, JULIUS B. SAVAGE, of Southington, in the county of Hartford and State of Connecticut, have invented certain new and useful Improvements in Machinery for Making Nuts; and I do hereby declare that the following, taken in connection with the drawings, is a full, clear, and exact description thereof.

In the drawings, Figure 1 is a front elevation of a machine in which my invention is embodied. Fig. 2 is a transverse vertical section of the same, taken in the line *x x* of Fig. 1. Fig. 3 is also a transverse vertical section of the same, taken in the line *y y* of Fig. 4. Fig. 4 is a horizontal section of the same, taken in the line *z z*, Fig. 1.

The same letters refer to the same parts in all the figures.

My invention consists mainly in certain new combinations of old parts, known to makers of nut, percussion-cap, and chain machinery, and in the machine in which my invention is shown embodied, as in the drawings, the blank is first cut, next swaged, and finally punched.

In the machine represented in the drawings, A represents a bed-plate properly supported at a suitable height, the upper surface of which constitutes a supporting table, upon which the blanks lie and over which they are transferred, and also a face-swage. Three uprights, B B B, are attached to the bed-plate, each having a ways or guide plate, C, attached thereto, in which slides bar or stock, D. To the end of one bar, D, one jaw of a shears, E, is fitted. To the end of another a die or face-swage, F, is attached, having a face corresponding to the blank, and to the lower end of the third a punch, G, is attached. The upper ends of the bars or stocks are each attached to the front ends of levers H in such manner that the bars will move vertically as the levers oscillate, and to the opposite ends of the levers are attached connecting-rods I, the lower ends of which are, in a usual manner, applied to eccentrics J on a driving-shaft, K.

Upon the table and with its hinder end supported in a slot, is a bar, L, the front end of which forms an edge-swage, this swage being a trifle thicker than the nut to be made, and a trifle wider than double the width of a nut. The bar L is caused to reciprocate by means of a tappet, *a*, on the shaft K, acting against a toggle-bar, *b*, a spring, *c*, attached to the under side of the bar giving the return-motion.

M is a stationary die-plate or edge-swage, attached to the bed-plate in line with the moving swage on the bar L, and the edges of blanks are swaged between these swages.

N is the stationary shear-jaw attached to the bed-piece, in proper relation to the moving shear jaw or cutter E, the two constituting a shears.

O is a counter-shaft, supported at the left-hand end of the bed-plate and caused to rotate by means of bevel-gearing *d d*. (See Fig. 4.) On the shaft O a tappet, *e*, is placed, and this tappet, in conjunction with a spring, *f*, to give the return-motion, actuates a reciprocating sliding plate, P, the end of which is notched to correspond in form with two slides of a nut, and is a moving edge-swage. Upon the bed-plate and opposite to this swage is a similarly formed stationary edge-swage, Q. This swage is inclined to an edge, or nearly so, (see Fig. 1,) in such manner that blanks may slide over it and then drop into place upon the table. The surface of the table itself forms the stationary face-swage opposite to and acting in connection with the moving face-swage F.

The front end of the shaft *e* carries a crank-pin, R, actuating a connecting-rod, *s*, attached to a pin on a sliding bar, T, mounted in proper guides upon the bed-plate. This bar carries two uprights or hangers, *g g*, in which is supported a rod, U, in such manner as to move with the sliding bar, but still to be free to turn upon its axis. To this rod an arm, V, is attached, which bears against a spring-guide, *h*, mounted upon a plate, *i*, the construction being such that by the aid of a spring, $a^{\times}$, the arm V is held away from the table when the rod moves in the direction of the arrow, Fig. 1, and nearer to the table when the rod moves in the opposite direction, thus depressing and lifting transferrers hereinafter described.

To the rod, so as to conform both to its reciprocating motions and those on its own axis, are attached transferrers *j k l m n*, which are pieces of metal passing over blanks supported upon the table when moving in a direction contrary to the arrow, Fig. 4, and applying themselves against and changing the position of such blanks (pushing them over the surface of the table) when moving in the direction of the same arrow. All these transferrers move at the same time in consequence of being all attached to the same rod.

To the right-hand or outer end of the slider T a bar, *o*, is attached, to which is secured another bar, W, the latter lying over the surface of the table and reciprocating upon it. This bar W is also a transferrer, but on account of its position does not need to rise and fall.

X is a stop or gage attached to the bed-plate.

The operation of the machine is as follows: Power being applied so as to cause the shafts to revolve and the moving parts of the machine to operate, a heated bar of iron, *y*, of proper size, is passed by the operator over the stationary shear-jaw and against the stop. The cutter or moving shear-jaw then descends and cuts off a blank. When the blank is cut off and rests upon the table, the transferrer W moves in the direction of the arrow, Fig. 4, and pushes the nut along the table until it is within reach of the transferrer *j*, which, as W moves back again, passes over the blank and drops behind it. The transferrer or conveyer *j* now pushes the blank along in front of the stationary edge-swage M, and the moving edge-swage then advances and compresses and smooths two sides of the nut as it lies on the table, while the transferrer *j* returns for another blank. As the moving edge-swage retreats from the stationary one, the conveyer *j* again moves in the direction of the arrow with a new or fresh-sheared blank, and a rod or pin, $b^{\times}$, attached to *j*, advances and turns the blank that has just been swaged, so that the moving and stationary edge-swage will complete the turn and swage the other two sides of the blank. The transferrer *k* then, after passing over the blank, moves it along till within reach of the transferrer *l*, which catches behind the blank, turns it as if on a horizontal axis, owing to its peculiar form, shown in Fig. 4, and places the blank under the moving face-swage F, which descends and compresses and smooths the upper and lower faces of the blank, which is pinched or gripped between the face-swage and the table. As the swage F rises the transferrer *n* moves behind the blank and then slides it along over the table and up the inclined plane of the stationary edge-swage, depositing the blank between the edge-swages P and Q. These swages again compress the nut and also center it under the punch, which descends and punches the blank, thus making a finished nut. A punch-die should be formed or supported in the table, and the nut may be removed from the punch as it rises, in any proper usual manner.

All the transferrers slide the blank along from place to place while lying upon and supported by the table. Some turn the blank, others do not, but while turning it they change its place while supported upon the table.

The edge-swages, although of different forms, all swage sides of a nut or blank while lying upon and supported by a table, and the idea upon which my invention is based and which has been reduced to practice is the combination of the table and transferrers with the swages, shears and punches of nut machinery, thus doing away with automatic fingers or pinchers.

I claim as of my own invention—

1. The combination of a shears with a table, transferrer, and edge-swages, the whole constructed and operated substantially as described.

2. The combination of a shears with a table, transferrer, and face-swages, substantially as described, in such manner that the transferrers do not hold or compress the sides of the nut while its face is being swaged, the whole constructed and operated substantially as described.

3. The combination of a shears with both face and edge swages by means of a supporting-table and transferrers, the whole constructed and operated substantially as specified.

4. The combination of edge-swages with face-swages by means of a table and transferrer, the whole constructed and operated substantially as described.

5. A combination of face-swages with a punch by means of a transferrer and supporting-table acting to transfer the blank between the two operations, the combination being substantially as described, and the above parts in combination with edge-swages, the whole constructed and operated substantially as set forth.

6. The combination of a shears and punch, edge-swages, and face-swages, by means of transferrers and a table, the two latter acting to transfer the blank so that it is operated upon by the former in different localities, the whole constructed and operated as described.

7. The arrangement in succession of, first, a shears; second, swages; and third, a punch, substantially as herein described, so that a blank is first cut off, then swaged, and finally punched, the whole constructed and operated substantially as forth.

8. In combination with a supporting-table, a transferrer with a notched or angular acting face, operating both to turn and move a blank, the whole constructed and operated substantially as described.

In testimony whereof I have hereunto subscribed my name.

JULIUS B. SAVAGE.

In presence of—
H. R. BRADLEY,
DOUGLAS P. WILLIAMS.